April 24, 1962     W. BLINDER     3,031,052
ONE-WAY CLUTCH
Filed March 6, 1959
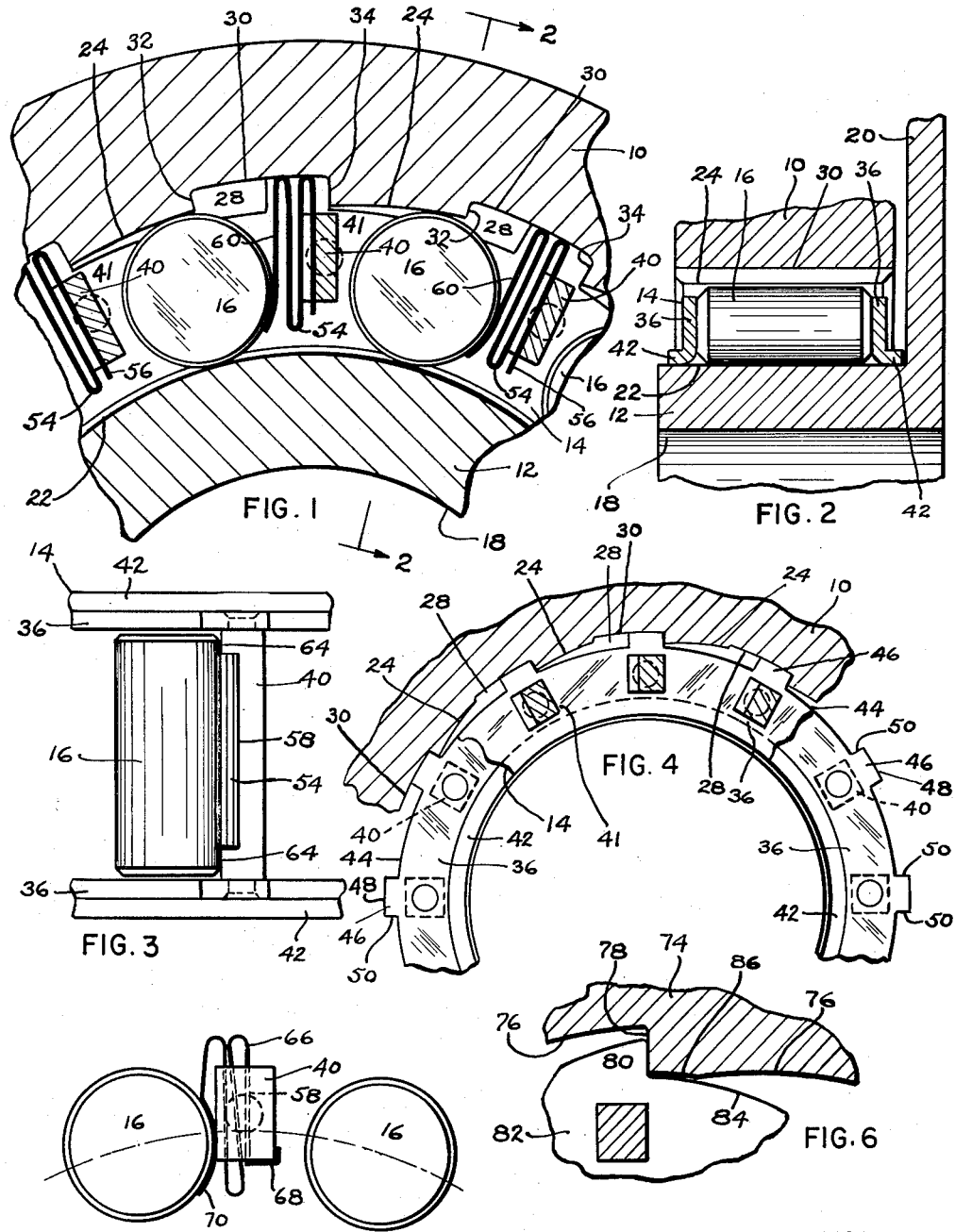
INVENTOR
WILLIAM BLINDER
BY Edward K. Goodrich
HIS ATTORNEY

United States Patent Office 3,031,052
Patented Apr. 24, 1962

3,031,052
ONE-WAY CLUTCH
William Blinder, Newington, Conn., assignor to General Motors Corporation, Detroit, Mich., a corporation of Delaware
Filed Mar. 6, 1959, Ser. No. 797,662
8 Claims. (Cl. 192—45)

This invention relates to one-way clutches and more particularly to a clutch wherein a pair of coaxial members are in one-way driving relation through a set of intervening rolling elements.

Various one-way clutches having inner and outer race rings and wedging elements therebetween have been provided. However, these prior devices have many objectionable limitations. Their torque capacity is low due to the limited number of rollers which may be used. Also, there is frequent slipping of one or more of the rollers when such a clutch is used in severe service causing these rollers to damage the race rings and other clutch parts often suddenly submitting the entire driving load to only a few of the rollers thereby causing frequent clutch failures. Additionally, the complicated multi-part mechanisms of these various prior clutches required the use of outboard bearings to provide the required race ring concentricity within acceptable limits. Furthermore, these prior one-way clutches had many individual parts which had to be installed at final assembly with the driving mechanisms. Consequently, many of these prior roller clutches have been replaced by other types of one-way clutches.

It is, therefore, an object of this invention to provide an improved, simply constructed, and rugged one-way clutch of the roller type which is compact and easily assembled in position.

Another object is to provide an improved roller one-way clutch of compact construction and having a high torque capacity uniformly distributed between many rollers which are simultaneously and individually urged into load-carrying positions.

A still further object of my invention is to provide an improved, one-way roller clutch of a construction having many closely spaced rollers which greatly increases the torque loading of the clutch over prior clutches of comparable size.

To these ends and also to improve generally upon devices of this character, this invention consists in the various matters hereinafter described and claimed. In its broader aspects, the invention is not necessarily limited to the specific structures selected for illustrative purposes in the accompanying drawings wherein:

FIGURE 1 is a fragmentary cross sectional view of my invention;

FIGURE 2 is a fragmentary diametrical sectional view taken along the line 2—2 of FIGURE 1;

FIGURE 3 is a fragmentary plan view showing one of the rollers mounted in the cage;

FIGURE 4 is a fragmentary view showing the cage mounted within one of the race rings;

FIGURE 5 is a fragmentary view showing another embodiment of the spring which urges a roller into operative driving relation; and FIGURE 6 is a fragmentary view showing a slightly different embodiment of my cage.

My compact one-way clutch mechanism has an important application in the automotive industry and particularly in torque converters or hydraulic transmission driving mechanisms. However, it will be appreciated that this clutch mechanism has many other uses in industry. My improved one-way clutch has an outer race ring 10 and a coaxial inner race ring 12. Between these rings I provide an annular cage 14 which guides a series of circumferentially spaced rolling elements 16 that enter into wedged driving relation between the rings in one direction of relative ring rotation and which permit a free overrunning ring rotation in the opposite direction of relative ring rotation. Springs urge the rollers individually towards and into clutch driving positions so that there is no lost motion between the race rings at time of clutch engagement and the load is uniformly distributed through all of the rolling elements. The outer race ring 10 may comprise a gear or other rotatable member which is in driving or driven connection to other mechanism. The inner race ring 12 is herein illustrated as a sleeve member or collar having an axial bore 18 for mounting on a shaft and having a radially extending flange 20 for driving or driven connection with other mechanism. If desired, the ring 12 may be keyed in driving or driven relation to the shaft in the bore 18. One of the race rings, as the inner race ring 12, has an annular raceway, herein shown as a cylindrical roller-engaging surface 22 coaxial with the race ring axis and the other race ring, as the outer race ring 10, has a series of corresponding circumferentially spaced arcuate cam surfaces 24 for one-way driving engagement with the rollers 16. It will be appreciated that alternatively these cam surfaces could be formed on the race member 12 and the cylindrical roller engaging raceway surface could be formed within the outer race ring 10. These arcuate cam surfaces 24 are out of radial alignment with any diameter through the race ring 10 and arcuately slope towards the raceway 22 to provide a tapering throat in which the rollers may wedge to provide a positive uni-directional clutch driving relation between the race rings. As illustrated, this throat tapers radially inwardly in a counterclockwise direction and the spacing at the counterclockwise end of each cam surface 24 is less than a roller diameter while the spacing at the other end of the cam surface appreciably exceeds the roller diameter. The race ring provided with the cam surfaces 24 is cut away or broached in circumferentially spaced alternating relation to these cam surfaces to provide arcuate recesses 28 each of which has a particylindrical wall 30 of the same radius and terminates in radial end walls 32 and 34 at the adjacent cam surfaces 24.

The annular cage 14 which circumferentially spaces the rollers 16, may be in plain bearing relation with the outer and inner race rings 10 and 12 to maintain these rings coaxial to assure smooth and uniform roller clutch operation. This cage has a pair of axially spaced annular end walls 36 secured in rigid spaced relation by circumferentially spaced cross bars 40 which with the end rings form roller-receiving pockets 41. Each end wall 36 has an annularly extending outwardly turned flange 42 in freely slidable plain bearing engagement with the cylindrical surface 22 of the race ring 12 to provide for relative rotation between the cage and this race ring. Each end wall 36 has circumferentially spaced arcuate peripheral portions 44 from which radially extend lugs or ears 46 that are provided with circumferentially spaced arcuate outer end walls 48 slidably mounted in plain bearing engagement with the arcuate walls 30 in the recesses 28 of the race ring 10. The ears 46 have generally radial end walls 50 which are spaced apart a distance with respect to the recess walls 32 and 34 to allow sufficient partial cage rotation so that the cross bars 40 may not restrict the rollers from wedged driving engagement.

The circumferential spacing between each pair of adjacent cross bars 40 is sufficient to allow for a small amount of movement of the rollers therebetween. The ends of the cross bars 40 are preferably slightly reduced in size and rigidly secured as by riveting to the end rings of the cage. The rollers 16 have flat end walls which are loosely guided by the opposing flat inner walls of the cage end rings and these end walls may be slightly chamfered at their peripheries. Each cage pocket is provided at one end with a generally accordion-shaped spring 54 that may be formed from flat stock and which serves to urge the rollers individually into driving position in engagement with a cam surface 24 and with the raceway 22. As illustrated in FIGURE 1, the slope of the cam faces 24 is preferably such that each roller 16 is in non-driving engagement at the clockwise end of each cam surface and such that each roller will firmly wedge in driving engagement a short distance counterclockwise from this position along each cam face 24. The accordion-shaped springs are preferably bent to shape from flat sheet metal and have at one end an arm 56. Each cross bar 40 has a recess 58 generally centrally located between the end cage rings 36 and of a depth to receive the accordion-shaped spring therein without permitting it to tightly collapse. The forward arm 60 of each spring is preferably curved slightly at its outer end to conform with the periphery of the adjacent roller. These springs are radially located by positioning their outer U-shaped portions against the wall 30 of the recess 28. The springs 54 normally urge the rollers 16 individually into engagement with the opposing raceway and cam surfaces 22 and 24 and locate the ears 46 in abutting engagement with the end walls 34 of the recesses 28. Hence, each roller is ready for clutching engagement at the start of each clutching operation and lost motion between the race rings is avoided at the initiation of a clutching operation. Additionally, in the event of slight non-conformity of the various cam surfaces or even a misalignment of race rings, the individual spring-urging of the rollers assures that each roller will immediately take its share of the load thus overcoming the trouble in prior clutch constructions wherein one or only a few rollers were suddenly subjected to full shock load.

With this arrangement, when the outer race ring 10 overruns the inner race ring 12 in a counterclockwise direction as viewed in FIGURE 1, or when the inner race ring 12 overruns the outer race ring 10 in a clockwise direction, the circumferentially spaced rollers 16 will simultaneously be relieved from their wedged engagement in the throats between the cams 24 and the raceway 22. At this time, each of the rollers 16 will be in non-drving relation permitting a free continued rotation of one of the race rings in an overrunning relation with respect to the other ring. When the outer race ring 10 tends to overrun the inner race ring 12 in a clockwise direction as viewed in FIGURE 1, or when the inner race ring tends to overrun the outer race ring in a counter-clockwise direction, the individually spring-urged rollers will immediately become wedged in driving engagement with the cam surfaces 24 and with the raceway 22 providing a positive one-way drive between the race rings wherein the load is uniformly distributed between all of the rollers.

In the embodiment of FIGURE 5, there is provided an accordion-shaped spring 66 of slightly different construction for urging each of the rollers 16 towards a clutching position. This spring has its end portion fitted within a recess 58 of the cross bar 40 in the same general manner as explained with reference to spring 54, but the end spring portion is provided with a generally rectangular shaped hook 68 which snugly fits around the lower portion of the cross bar 40. Also, the forward end of this spring 66 is curved to provide an arcuate portion 70 that receives the rollers 16.

In the embodiment of FIGURE 6, the outer race ring 74 is provided with circumferentially spaced arcuate cam surfaces 76 that engage the rollers 16 in one-way driving relation in the same manner as explained with reference to FIGURE 1. However, these cam surfaces 76 extend to include the recess portion 28 shown in FIGURE 1 and terminate in generally radial end walls 78 against which protruding lugs or ears 80 on each end ring 82 of the cage may respectively engage. The cage end rings are provided between these lugs 80 with circumferentially spaced parti-cylindrical portions 84 which are concentric with the cage axis and journalled for plain bearing slidable movement on circumferentially spaced parti-cylindrical portions 86 of the outer race ring. With this arrangement, the cylindrical engagement of the cage 82 on the cylindrical raceway 22 of the inner cage 12 coupled with the cylindrical fit of the cage surfaces 84 and the outer race ring surfaces 86, serve to maintain the inner and outer race rings coaxial with each other. Also, each of the cage lugs 80 will be free to move through a short arcuate distance in the same manner as the cage lugs 46 in the prior referred to construction of FIGURES 1 through 4 thus providing for a partial cage rotation similar to that of the cage 14.

I claim:

1. A one-way clutch comprising a pair of relatively rotatable annular members one of which has an annular raceway, said other member having a plurality of circumferentially spaced arcuate cam surfaces radially spaced from said raceway, each of said cam surfaces arcuately sloping correspondingly towards the raceway in one direction circumferentially of the raceway, a rotatable annular cage between said relatively rotatable annular members, said cage having circumferentially spaced pockets respectively opening onto said cam surfaces, each pocket having a transverse wall, a rolling element in each pocket and arranged for engagement in and for release from wedged driving engagement with one of the cam surfaces and with said raceway while said rolling element is in spaced relation to said wall, means limiting the arcuate movement of the cage in the direction of release of a roller from driving engagement, and cage supported springs urging the rollers respectively towards said walls and individually locating the rollers at all times in drive-engaging positions whereby each roller will assume a corresponding share of the driving load at the start of clutch engagement.

2. A one-way clutch comprising a pair of relatively rotatable coaxial annular members, one of which has an annular raceway, said other member having a plurality of circumferentially spaced arcuate cam surfaces radially facing and spaced from said raceway, each cam surface being correspondingly curved and arcuately sloping towards said raceway in a direction away from that of clutch rotation, a rotatable annular cage between the raceway and the cam surfaces and journalled on one of said relatively rotatable annular members, a plurality of rollers guided by the cage, each roller being arranged for a limited movement within the cage, said rollers being arranged for engagement in and release from wedged driving simultaneous engagement with a cam surface and with said raceway, springs mounted on the cage and individually locating each of said rollers in continuous engagement with one of the cam surfaces and with said raceway during clutch release, said rollers being in positions for an immediate wedged driving engagement free of lost motion and wherein the driving load is divided between all rollers at start of driving engagement, and radial projections on the cage respectively engageable with shouldered portions on said other annular member to limit the extent of arcuate movement between the cage and said last mentioned member.

3. A one-way clutch comprising a pair of relatively rotatable coaxial annular members one of which has an annular raceway, said other member having a plurality of circumferentially spaced arcuate cam surfaces radially facing and spaced from said raceways, said other member having arcuate recesses alternating with the cam surfaces, each cam surface arcuately sloping towards said raceway in a direction away from that of clutch rotation, a rotatable annular cage between the raceway and said cam surfaces, a plurality of spaced rollers guided by the cage, each roller being correspondingly positioned between a cam surface and the raceway, radially projecting lugs on the cage respectively received and arcuately slidable within said arcuate recesses and engageable with the ends of said recesses to limit the extent of arcuate movement of the cage with respect to said other annular member, a spring engaging each roller and individually locating said rollers in contact with one of the cam surfaces and with said raceway in position for immediate simultaneous wedged driving engagement between a cam surface and said raceway and said springs yieldably permitting the rollers to disengage from driving relation when one of the annular members overruns the other annular member in a non-driving direction.

4. A one-way clutch comprising a pair of relatively rotatable coaxial annular members one of which has an annular raceway, said other member having a plurality of circumferentially spaced cam portions radially spaced from the raceway, circumferentially spaced pairs of shoulders on said other member, each shoulder being located between a pair of adjacent cam portions, a rotatable annular cage between the annular members and rotatably journalled on each of said members, cross bars on the cage forming with the cage circumferentially spaced pockets, a roller in each pocket and arranged for entry into and release from corresponding one-way wedged driving engagement between a cam portion and the raceway, springs mounted on the cross bars individually and yieldably positioning the rollers in continuous contact with said cam portions and with said raceway for immediate clutch driving engagement, and radially extending cage projections engageable with said shoulders, each cage projection being movable between a pair of said shoulders to provide for a limited cage rotation with respect to said other member.

5. A one-way clutch comprising a pair of relatively rotatable coaxial annular members one of which has an annular raceway, said other member having a series of circumferentially spaced cam portions radially spaced from the raceway, a rotatable annular cage between the annular members and journalled for free turning movement on each of said members, shoulder means between adjacent cam portions and associated with the cage and with said other member limiting the extent of cage turning movement with respect to the cam portions, cross bars on the cage forming with the cage circumferentially spaced pockets, a roller in each pocket and arranged for engagement in and release from one-way wedged driving engagement with one of said cam portions and with said raceway, each cross bar having a recessed portion, and a spring in each recessed portion yieldably and individually locating the rollers in continuous drive engaging positions against the cam portions and against the raceway whereby there will be no lost motion movement between said relatively rotatable members at the start of a clutch engaging operation.

6. A one-way clutch comprising a pair of relatively rotatable coaxial annular members one of which has an annular raceway, said other member having a plurality of circumferentially spaced cam portions, said other member having radially disposed shoulders located between each pair of adjacent cam portions, a rotatable annular cage journalled on the raceway and journalled on said other member between the cam portions and the shoulders, cage projections engageable with the shoulders and limiting the cage to a predetermined partial rotation with respect to the cam portions, cross bars on the cage forming with the cage circumferentially spaced pockets, a roller in each pocket and arranged for entry into and release from one-way wedged driving engagement with a cam portion and the raceway, and springs demountably secured to the cross bars and yieldably locating the rollers individually in continuous drive-engaging positions with the cam portions and with said raceway.

7. A one-way clutch comprising a pair of relatively rotatable coaxial annular members one of which has an annular raceway, said other member having a plurality of circumferentially spaced arcuate cam surfaces radially spaced from the raceway, each of said cam surfaces being of corresponding curvature and arcuately sloping correspondingly towards said raceway in only one direction circumferentially of said raceway, an annular cage between the raceway and said cam surfaces, said cage being journalled to freely turn on each of said annular members, a plurality of circumferentially spaced rollers guided by the cage, each roller being located between one of said cam surfaces and the raceway for engagement in and release from one way wedged driving engagement between one of said cam surfaces and said raceway, springs on the cage individually and yieldably locating the rollers against the cam surfaces and against the raceways in position for immediate and simultaneous wedged driving engagement, means limiting the extent of turning movement of said cage with respect to said cam surfaces, and said springs locating the cage at one end of its limited movement when the rollers are not in said wedged driving engagement whereby lost motion between the relatively rotatable members is eliminated at the start of one-way driving engagement.

8. A one-way clutch comprising a pair of relatively rotatable radially spaced coaxial annular members one of which has an annular raceway, said other member having an arcuate cam surface radially spaced from the raceway and longitudinally sloping towards the raceway in one direction circumferentially of said raceway, an annular cage between and rotatably journalled on said coaxial annular members, means limiting the cage to a predetermined extent of partial rotation with respect to the cam surface, said cage being in freely rotatable relation with respect to the annular raceway, said cage having a roller-receiving pocket terminating in a transverse cage wall, a roller received in and guided by said pocket, said roller being movable into and out of one-way wedged driving engagement with the cam surface and with said raceway, yieldable cage supported means resiliently urging the roller towards said wall and towards a unidirectional wedged driving engagement, said yieldable means locating the cage at one end of its partial rotation and positioning the roller spaced from said wall and in simultaneous engagement with both the cam surface and said raceway when no driving relation is being transmitted between said relatively rotatable annular members.

References Cited in the file of this patent
UNITED STATES PATENTS

| 2,029,244 | Linder | Jan. 28, 1936 |
| 2,815,838 | Dodge | Dec. 10, 1957 |
| 2,835,364 | Picard | May 20, 1958 |
| 2,843,238 | Rozner | July 15, 1958 |
| 2,892,522 | Moo | June 30, 1959 |

FOREIGN PATENTS

| 1,162,705 | France | Apr. 14, 1958 |